United States Patent
Pan et al.

(10) Patent No.: US 11,503,074 B2
(45) Date of Patent: Nov. 15, 2022

(54) DEVICE ENROLLMENT IN A MANAGEMENT SERVICE

(71) Applicant: VMware, Inc., Palo Alto, CA (US)

(72) Inventors: Suyu Pan, Sandy Springs, GA (US); Naveen Pitchandi, Atlanta, GA (US); Gerard T. Murphy, Lawrenceville, GA (US); David Jablonski, Acworth, GA (US); Christopher Burns, Smyrna, GA (US)

(73) Assignee: VMWARE, INC., Palo Alto, CA (US)

( * ) Notice: Subject to any disclaimer, the term of this patent is extended or adjusted under 35 U.S.C. 154(b) by 574 days.

(21) Appl. No.: 16/518,563

(22) Filed: Jul. 22, 2019

(65) Prior Publication Data

US 2021/0029162 A1 Jan. 28, 2021

(51) Int. Cl.
*H04L 9/40* (2022.01)
*G06F 9/451* (2018.01)

(52) U.S. Cl.
CPC .............. *H04L 63/20* (2013.01); *G06F 9/451* (2018.02); *H04L 63/08* (2013.01)

(58) Field of Classification Search
CPC ......... H04L 63/08; H04L 67/34; H04L 63/20; G06F 9/4405; G06F 8/61; G06F 9/453; G06F 9/4451; G06F 9/451

USPC .......................................................... 726/1
See application file for complete search history.

(56) References Cited

U.S. PATENT DOCUMENTS

2017/0064549 A1* 3/2017 Rykowski ............. H04L 63/105
2020/0186365 A1* 6/2020 Kumar .................. H04L 9/0891

OTHER PUBLICATIONS

IBM Integration Bus, Version 9.0.0.8 Operating Systems: AIX, HP-ltanium, Linux, Solaris, Windows, z/OS TimeoutNotification node—IBM Documentation Jul. 21, 2017 (Year: 2017).*

* cited by examiner

*Primary Examiner* — Benjamin A Kaplan
(74) *Attorney, Agent, or Firm* — Thomas | Horstemeyer, LLP

(57) ABSTRACT

Disclosed are various examples for enrolling a device in a management service. An enrollment wizard can include a series of user interfaces to facilitate enrollment of a device in the management service. Enrollment data can be obtained from the user and sent to the management service for authentication of the user and device. A user interface object can be instantiated to access a webpage within a user interface of the enrollment wizard for downloading a configuration profile provided by the management service. A user can be redirected to a settings application to install the configuration profile.

20 Claims, 6 Drawing Sheets

DEVICE ENROLLMENT IN A MANAGEMENT SERVICE

BACKGROUND

With the emergence of bring-your-own-device (BYOD) technology in the workplace, enterprises permit employees or other personnel to use their own devices for business purposes. This can include accessing enterprise data, such as email and corporate documents. However, prior to an employee using his or her own device in the workplace, a company can require the employee to enroll with a management service capable of protecting enterprise data from theft, loss, and unauthorized access. Administrators can utilize the management service to oversee operation of the devices enrolled with or otherwise managed by the service.

Enrollment of a device with the management system can include installation of a configuration file on the device that defines configuration settings for the device in accordance to settings specified by the administrator of the management service. To protect a user from unintentionally downloading and installing malware or other type of harmful software or files that could compromise the user or user device, the operating system of the device can require specific procedures for downloading and installing the configuration files.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
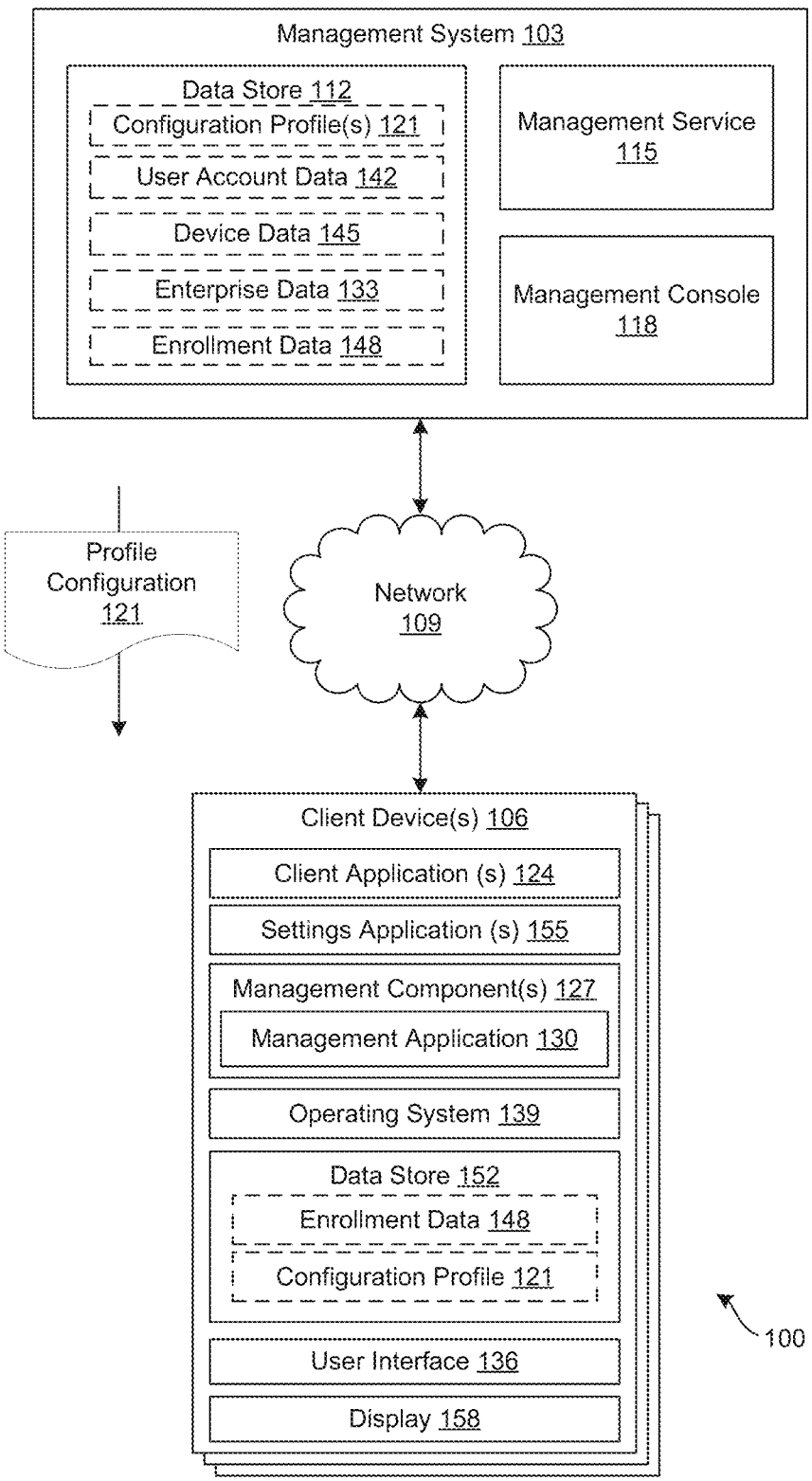
FIG. 1 is a drawing of an example of a networked environment, including a management system and a client device.

The present disclosure relates to enrolling a user device with a management service. In an enterprise management environment, a management service enforces security policies of the enterprise on user devices, such as smartphones, tablets, laptops, and other suitable devices. The policies can include, for example, restrictions or permissions pertaining to capabilities of a device such that access to enterprise data is secured on the device. For instance, an enterprise or other organization can manage BYOD devices of contractors, employees, clients, customers, or other personnel to protect data from theft, loss, and unauthorized access. The policies and settings can be defined by an administrator of the management service and included in a configuration profile that is provided by the management service.

Device enrollment with the management service includes configuring the device in accordance to the settings defined by an administrator by downloading and installing the configuration profile. To protect a user from unintentionally downloading and installing malware or other type of harmful profiles that could compromise the user or user device, an operating system of the device can require specific procedures for downloading and installing certain types of files, including configuration profiles. In particular, the operating system can require the user of the client device to interact with multiple applications to download and install the configuration profile to ensure that a user is aware of the files being downloaded and installed on his or her device. For example, APPLE® iOS requires a user to download configuration profiles generated by the management service using a specific web browser (e.g., SAFARI®) or native email application. Upon successful download of the configuration file, APPLE® iOS then requires the user to manually access the settings application to install the configuration profile.

Typically, to begin the enrollment process, a user can interact with a client application, such as a management application, that is associated with the management service. The management application can provide a series of user interfaces to facilitate the enrollment of the user device with the management service. For example, the management application can provide one or more user interfaces that assist a user in performing the required steps for enrolling the device with the management service, including how to download and install the configuration profile for configuring a device in accordance to settings defined by an administrator of the management service. As the enrollment process relies on a user to perform various steps that require the user to interact with multiple separate applications, the risk of an incomplete enrollment due to a user becoming confused or distracted during the enrollment process is increased.

Enrollment can include authenticating the user device using login information, such as an email address, username, or password, as well as device information or biometric information that is provided through interactions with user interface provided by the client application. For example, the user can provide server details and authentication data which can be used by the management service to authenticate the user. Typically, upon authentication of the device, the user is redirected to the specific web browser required by the operating system to download the configuration profile. In the case of APPLE® iOS, for example, the web browser can be limited to SAFARI®. Once the configuration profile is successfully downloaded, the user can be required to manually navigate to the settings application associated with the operating system to install the downloaded configuration profile. As the user is required to interact with and navigate to multiple different applications during the enrollment process, the risk of a user becoming confused or distracted during the enrollment process increases, thereby increasing the likelihood the user will not complete the steps required for a successful enrollment of the device. Therefore, it can be beneficial to keep the user captive and more engaged with the enrollment process by reducing the number of instances in which the user is required to access separate applications during the enrollment process, thereby increasing the likelihood of a successful enrollment.

According to various implementations, a management application of the client device can instantiate a user interface object associated with a user interface of the enrollment interface. The user interface object provides access to a website for downloading the configuration profile from the management service. As such, the user is no longer required to be redirected to or otherwise access a separate application for downloading the configuration profile and can cause the download the configuration profile can be downloaded within the enrollment wizard rendered by the management application. For example, the management application can instantiate a user interface object, such as Safari ViewController, to allow access to the web view for downloading the profile without redirecting the user to a separate application. The management service can provide the management application a uniform resource locator (URL) or other address for accessing the enrollment configuration profile and the management application can include the appropriate address for accessing the enrollment configuration profile with the Safari ViewController, or other suitable object, call.

Upon a successful download of the configuration profile, the management application can render a user interface that provides instructions for installing the configuration profile. The management application can further render a user interface that includes a selectable component, that when selected, redirects the user to the settings application, or other appropriate application, to allow the user to install the configuration profile in accordance to the operating system requirements.

With reference to FIG. 1, shown is an example of a networked environment 100. The networked environment 100 can include a management system 103 and client devices 106 in communication with one other over a network 109. The management system 103 can provide an enterprise with access to email, corporate documents, social media and other enterprise content. The network 109 can include, for example, the Internet, intranets, extranets, wide area networks (WANs), local area networks (LANs), wired networks, wireless networks, other suitable networks, or any combination of two or more such networks. For example, the networks can include satellite networks, cable networks, Ethernet networks, telephony networks, and other types of networks.

The management system 103 can include, for example, a server computer or any other system providing computing capability. Alternatively, the management system 103 can include a plurality of computing devices that are arranged, for example, in one or more server banks, computer banks, or other arrangements. The management system 103 can include a grid computing resource and/or any other distributed computing arrangement. The computing devices can be located in a single installation or can be distributed among many different geographical locations. The management system 103 can also include or be operated as one or more virtualized computer instances. For purposes of convenience, the management system 103 is referred to herein in the singular. Even though the management system 103 is referred to in the singular, it is understood that a plurality management systems 103 can be employed in the various arrangements as described above. As the management system 103 communicates with the client devices 106 remotely over the network 109, the management system 103 can be described as a "remote" or "cloud" management system 103 or a collection of one or more computing devices.

The management system 103 can include a data store 112. The data store 112 can include memory of the management system 103, mass storage resources of the management system 103, or any other storage resources on which data can be stored by the management system 103. The data stored in the data store 112, for example, can be associated with the operation of the various applications or functional entities described below.

The components executed on the management system 103 can include, for example, a management service 115, a management console 118, as well as other applications, services, processes, systems, engines, or functionality not discussed in detail herein. The management service 115 can oversee the operation of multiple client devices 106. In some embodiments, an enterprise, such as one or more companies or other organizations, can operate the management service 115 to oversee or manage the operation of the client devices 106 of its employees, contractors, customers, or other users having user accounts with the enterprise. An enterprise can include any customer of the management service 115.

The management console 118 can provide an administrative interface for configuring the operation of the management service 115 and the configuration of client devices 106 that are administered by the management service 115. Accordingly, the management console 118 can correspond to a web page or web application provided by a web server hosted in the management system 103. For example, the management console 118 can provide an interface for an administrative user to create enrollment configuration profiles 121 to be applied to individual client devices 106, as well as various other actions related to the operation of various implementations.

The management service 115 can cause various software components to be installed on a client device 106. Such software components can include, for example, client applications 124, management components 127, including a management application 130, resources, libraries, drivers, device configurations and profiles, or other similar components that require installation on the client device 106 as specified by an administrator of the management service 115. The management service 115 can further cause policies to be implemented on a client device 106. Policies can include, for example, restrictions or permissions pertaining to capabilities of a client device 106 such that access to enterprise data 133 is secured on the client device 106.

The management service 115 can interact with one or more client applications 124 or management components 127 executed on the client device 106 to perform management functions. In one example, the management service 115 can interact with a management application 130 of the management components 127 on a client device 106 associated with an end user to enroll the client device 106 with the management service 115. The management application 130 can also provide an enrollment interface for users by generating a series of user interfaces 136, also known as a "wizard," to facilitate the enrollment of the client device 106 with the management service 115. For example, the management application 130 can provide one or more user interfaces 136 that allow a user to perform the required steps to download and install a configuration profile 121 as part of enrolling the client device 106 with the management service 115. The management component 127 can be installed when the client device 106 is enrolled as a managed device with the management service 115. When enrolled, the management component 127 can be registered as a device administrator of the client device 106, which can provide the management component 127 with sufficient privileges to control the operation of the client device 106. In one example, the management component 127 can be registered as the device administrator through the installation of a management profile at the operating system 139 of the client device 106 that causes the operating system 139 to designate the management component 127 as the device administrator.

The management service 115 can direct the management component 127 to perform device management functions on the client device 106. For example, the management service 115 can direct the management component 127 to control access to certain software or hardware functions available on the client device 106. As a result, the management service 115 can verify that the configuration and operation of the client device 106 is in conformance with predefined criteria that ensures that enterprise data 133, or other data, is protected from data loss, unauthorized access, or other harmful events.

The management service 115 can further provision enterprise data 133 to the client device 106 through the management component 127. In one example, the management service 115 can cause the management component 127 to control use of the client device 106 or provision enterprise data 133 to the client device 106 through use of a command queue provided by the management service 115. In some examples, the management service 115 can store commands in a command queue associated with a particular client device 106 and accessible by the particular client device 106. In some examples, the management service 115 can transmit an instruction to an original equipment manufacturer (OEM) messaging service specific to the client devices 106 to cause the OEM specific messaging service to send an instruction to the operating systems 139 of the client devices 106, which causes the client devices 106 to retrieve commands from the command queues provided by the management service 115. In other examples, the management component 127 is executed by such client device 106 to retrieve the contents of the command queue. In one example, the management component 127 can retrieve the contents of the command queue on a configured interval, such as every four hours, or upon detection of a certain event, such as detection of an unauthorized application being executed by the client device 106. The management service 115 can also push commands to the management component 127.

In any case, the management component 127 can receive the contents of the command queue from the management service 115. In one example, the command queue can include a command that the management component 127 should cause to be executed on the client device 106. In another example, the contents of the command queue can include a resource or other client application 124 that the management component 127 should cause to be installed on the client device 106, which the client device 106 can access through a specified uniform resource locator (URL). For example, the URL could be used to access the configuration profile 121 to be downloaded during enrollment of a user device 106.

In addition, the management service 115 can request that the client device 106 check in using a notification service like APPLE® Push Notification Service (APNS), GOOGLE® Cloud Messaging (GCM), or WINDOWS® Push Notification Services (WNS). The management service 115 can transmit a request to the notification service requesting that the client device 106 check-in or requesting that an application or web app check-in. The notification service can push or otherwise route a notification to the client device 106. Once the notification is received, the management component 127 can cause the client device 106 to check-in with the management service 115. As described above, the management component 127 can determine whether a command queue provided by the management service 115 for the respective client device 106 contains any commands or resources for the client device 106, and, if so, can cause the commands or resources to be downloaded or implemented on the client device 106. Other types of push notifications can also be transmitted through the push notification service.

The management service 115 can provide functionality using application program interfaces (APIs). The management service 115 can oversee the operation of client devices 106 enrolled with the management service 115 as well as manage enrollment and un-enrollment operations of the client devices 106. APIs or API calls can be provided for other functionalities of the management service 115 as discussed. For instance, APIs provided can include Representational State Transfer (REST) APIs, Identity Services Engine (ISE) APIs and other APIs.

The data stored in the data store 112 can include, for example, configuration profiles 121, user account data 142, device data 145, enterprise data 133, enrollment data 148, as well as other data. The configuration profiles 121 define the restrictions and settings of the client devices 106 enrolled (or to be enrolled) with the management service 115. For example, an administrator can interact with the management console 118 to define the settings and restriction employed on the client devices 106 enrolled in the management service. The configuration can be based on the enterprise group, enterprise domain, user, device operating systems, and/or other features.

For instance, a setting of the configuration profile 121 can require a particular hardware setting for a Bluetooth device, a WiFi device, an infrared device, a camera device, an audio recording device, a speaker device, a near-field communication (NFC) device, a radio-frequency identification (RFID) device or another hardware device. The settings defined by the configuration profile 121 can permit or deny any of the states of the client device. For example, setting can require that one or a group of the hardware devices are enabled or disabled. The states can also include software settings of the client device 106. A list of software settings can identify whether a software functionality of the client device 106 is enabled or disabled. The software functionality can be provided by an operating system 139 of the client device 106 or other instructions executed on the client device 106.

The settings defined by the configuration profiles 121 can include device-specific or user-specific settings, for example, restrictions or permissions pertaining to capabilities of a client device 106. For instance, settings can require certain hardware or software functions of the client device 106 to be enabled or disabled during a certain time period or when the client device 106 is physically located at a particular location. The configuration profile 121 can include an extensible markup language (XML) document, or other suitable type of file, that can be communicated to the client device 106 or otherwise accessed by the management component 127.

The user account data 142 can include information pertaining to end users of the client devices 106 enrolled with the management service 115. For instance, the user account data 142 can include data used to authenticate an end user, such as a username, password, email address, biometric data, device identifier, registry identifier, or other data. Additionally, the user account data 142 can include other information associated with an end user, such as name, organization unit, or other information.

The device data 145 can include information about the client device 106. The device data 145 can include, for example, information specifying applications that are installed on the client device 106, configurations or settings that are applied to the client device 106, user accounts associated with the device 106, the physical location of the client device 106, the enterprise associated with the client device 106, the network to which the client device 106 is connected, the device group(s) to which the client device 106 belongs, and/or other information associated with the client device 106. Enterprise data 133 can include email, corporate documents, social media, messages, enterprise applications, confidential documents, and other enterprise content or communications.

Enrollment data 148 can include information for enrollment of a client device 106 with the management service 115. The enrollment data 148 can include an enrollment token like a character string, value, parameter, or file that can be used to authenticate the client device 106 with the management service 115. In some cases, the management service 115 can provide enrollment tokens corresponding to each of the client devices 106 and/or users that have a user account with the enterprise. To this end, a request for an enrollment token can be required to include a device identifier, username, password, or other information. An enrollment token can be valid during a certain time period after which the enrollment token can expire.

Enrollment data 148 can also include a network address or other information to facilitate communication between the client device 106 and the management service 115. Enrollment data 148 can also include a network endpoint address and other instructions for communications with the management service 115. The enrollment data 148 can be transmitted to the client device 106 and stored in the data store 152.

The client device 106 can be representative of one or more client devices 106. The client device 106 can include a processor-based system, such as a computer system, that can include a desktop computer, a laptop computer, a personal digital assistant, a cellular telephone, a smartphone, a set-top box, a music player, a tablet computer system, a game console, an electronic book reader, or any other device with like capability. The client device 106 can also be equipped with networking capability or networking interfaces, including a localized networking or communication capability, such as a near-field communication (NFC) capability, radio-frequency identification (RFID) read or write capability, or other localized communication capability.

The client device 106 can include the operating system 139, which can be configured to execute various client applications 124, such as the management components 127, a settings application 155, as well as other applications. In particular, the operating system 139 can include a system software that facilitates operation of the client device 106, and execution of additional client applications. The main operating system 139 can include an APPLE® iOS operating system, a MICROSOFT® Windows operating system, an APPLE® macOS operating system, a Linux operating system, a GOOGLE® Android operating system, or other operating systems.

Some client applications 124 can access enterprise data 133 and other network content served up by the management system 103 or other servers, thereby rendering a user interface 136 on a display 158, such as a liquid crystal display (LCD), touch-screen display, or other type of display device. To this end, some client applications 124, including the management application 130, can include a browser or a dedicated application, and a user interface 136 can include a network page, an application screen, or other interface. In some examples, a network page can include a web page having source code defined in hypertext markup language (HTML), cascading style sheets (CSS), Javascript, jQuery, or other applicable client-side web-based scripting language. Further, other client applications 124 can include device management applications, enterprise applications, social networking applications, word processors, spreadsheet applications, media viewing applications, instant messaging applications, or other applications.

The settings application 155 provides an interface allowing a user to setup and/or modify application and device settings. In some examples, the settings application 155 can allow a user to install a configuration profile 121 or other type of profile that defines the particular settings and restriction domain. The settings application 155 can be part of the operating system 139 and can included settings specific to the operating system 139 of the client device 106.

The management components 127 can perform actions on the client device 106 in accordance to the management service 115. For instance, the management application 130 can enroll the client device 106 with the management service 115. The management application 130 can transmit an enrollment request to an enrollment endpoint of the management service 115. The enrollment request can include an enrollment token and a device identifier of the client device 106. The management application 130 can receive and install an enrollment configuration profile 121 to complete enrollment. The enrollment configuration profile 121 can be transmitted from the management service 115 to the client device 106.

The management application 130 can also cause the client device 106 to check-in with the management service 115, identify an action in the command queue and perform the action. An action can include the installation of a profile, or the execution of a command or other actions to install software components or implement additional profiles 121. The management application 130 can cause a check-in of the client device 106 periodically, on a schedule or upon an event, such as entering a physical location, changing a state of the client device 106, installing an application or receiving a notification on the client device 106. In one example, the contents of the command queue can include a command that the management application 130 executes on the client device 106. In another example, the contents of the command queue can include a resource that the management application 130 or other client application 124 installs on the client device 106.

The client device 106 can also include a data store 152. The data store 152 can include memory of the client devices 106 or any other storage resources on which data can be stored by the client device 106. In some examples, the data store 152 can include enrollment data 148, configuration profile(s) 121, or other types of data. The data store 152 can include other data associated with the client application 124, management components 127, the setting application 155, the operating system 139, and other applications.

Figure 2:
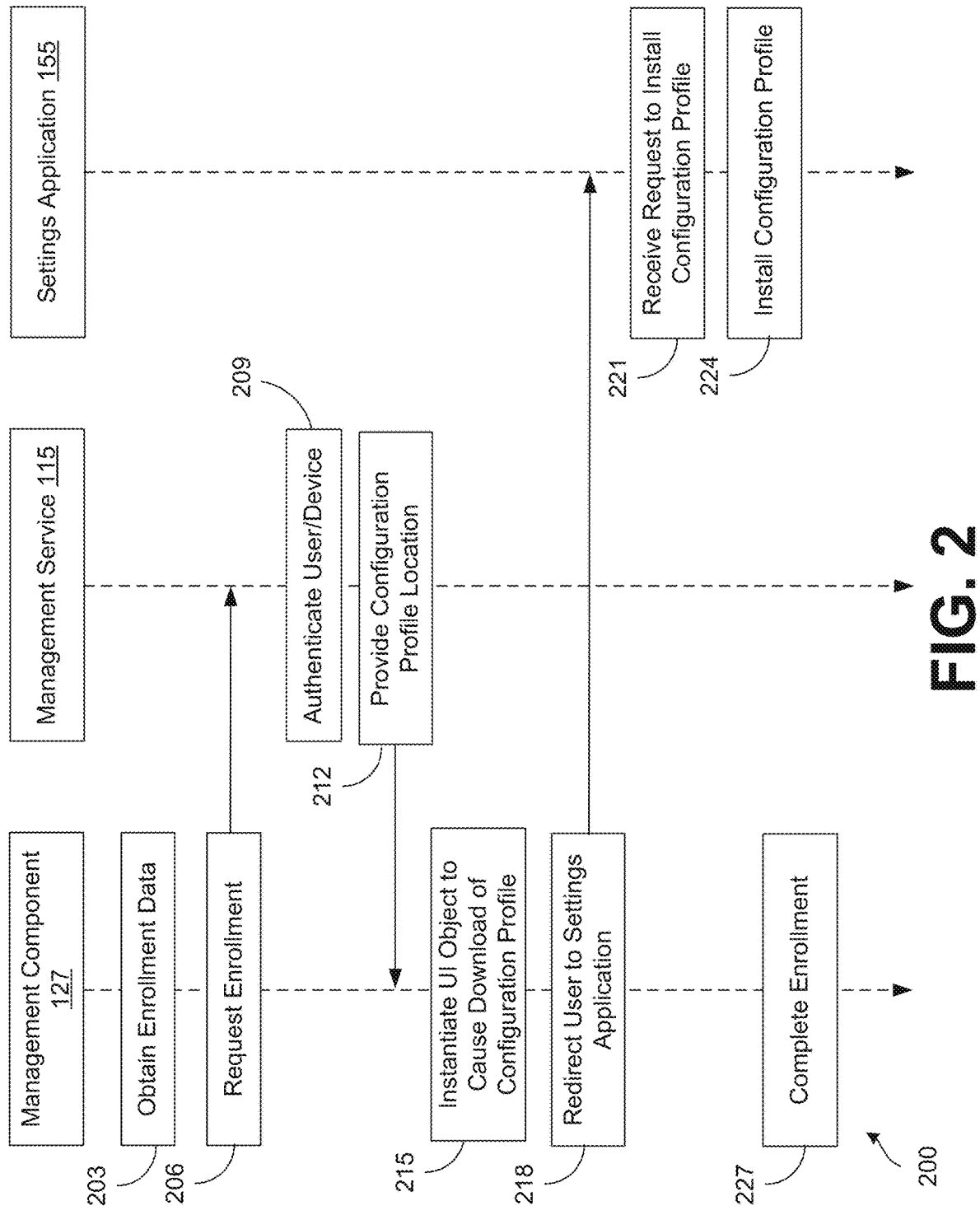
FIG. 2 is an example of a sequence diagram illustrating functionality implemented by components of the networked environment.

Turning now to FIG. 2, a sequence diagram 200 is shown illustrating functionality implemented by components of the networked environment 100. To begin, enrollment of a device 106 with the management service 115 is initiated by a user opening the management component 127, or management application 130, which can generate and render an enrollment wizard including a series of user interfaces 136 that facilitate enrollment of the client device 106 with the management service 115.

For example, to enroll a client device 106, the management component 127 can connect to the management service 115 to provide information about the client device 106 and the user of the device 106. In step 203, the management component 127 obtains enrollment data from the user through the enrollment interface. The enrollment data can include user account data 142, device data 145, or other type of information that can be used to authenticate the user or device 106 with the management service 115. For example, the user can submit identifying information (e.g., username, password) which can be used to identify the user. In some examples, the user can submit domain information which can be used to identify the enterprise or organization that will be managing the device 106. In some examples, the management component 127 can obtain device data 145 associated with the device with or without user input. The device data 145 could include the make, model, and type of the client device 106 (e.g., an APPLE® IPHONE6S® or other mobile device) and other information. The enrollment data can then be used by the management service 115 to authenticate the user and determine which policies to select for enforcement on the client device 106 (e.g., usage restrictions, installation of approved applications, removal of unapproved applications, values for security).

In step 206, the management component 127 communicates with the management service 115 to request enrollment of the device 106. For example, the management component 127 can send the enrollment data to the management service 115. The management application 130 can transmit an enrollment request to an enrollment endpoint of the management service 115. The enrollment request can include the enrollment data including, for example, an enrollment token and a device identifier of the client device 106.

In step 209, the management service 115 obtains the enrollment data from the management component 127 and authenticates the user and client device 106 to proceed with enrollment. The management service 115 can authenticate the user using the user account data 142 provided in the enrollment request. In particular, the management service 115 can compare the information included with the enrollment data that identifies the user with user account data 142 stored in the data store 112 to determine if the user is authenticated and if the device 106 can be managed. In addition, the management service 115 can determine the policies that will be applied to the requesting device 106 according to the user account data, device data, domain data, and other information.

At step 212, the management service 115 can provide to the management component 127 a uniform resource locator (URL) or other address identifying a location in the data store 112 of the enrollment configuration profile 121 for the particular device 106. The enrollment configuration profile 121 can define settings based on the policies determined by the management service 115 to be applied to the requesting device 106.

At step 215, the management component 127 instantiates a user interface object associated with a user interface of the enrollment wizard to access a webpage for initiating the download of the configuration profile. Instantiating the user interface object includes loading the provided URL for downloading the enrollment configuration profile 121 without the need of a separate browser application. For example, the user interface object can include the SafariViewController object, or similar type of object, that allows access to a webpage within the enrollment interfaces provided by the management component 127. By being able to provide access to the URL associated with the enrollment configuration profile 121 designated by the management service 115 without leaving the enrollment interface of the management component 127, the potential for user confusion or distraction is minimized. By keeping the user engaged with the enrollment process without having to go to the separate application, the user is more likely to continue with the installation process of the configuration profile 121 required to complete enrollment. Upon instantiating the user interface object to load the provided URL, the management component 127 downloads the enrollment configuration profile 121 from the management service 115. The enrollment configuration profile 121 can be downloaded to the data store 152 and can be accessed by the settings application 155 or other appropriate application.

At step 218, management component 127 can notify the user through the enrollment interface of the next steps required to complete enrollment. For example, some operating systems 139 (e.g., APPLE® iOS) can require that the configuration profile 121 be installed through the settings application 155 associated with the operating system 139. In this situation, the management component 127 can render one or more user interfaces 136 instructing the user how to install the enrollment configuration profile 121. For example, the user interface(s) 136 can include step-by-step instructions that provide visual examples of how to install the profile 121 within the settings application 155, or other suitable application. A user interface 136 can include a selectable component, that when selected by the user, redirects the user to the settings application 155 where the user can proceed with installing the enrollment configuration profile 121.

At step 221, the settings application 155 can receive a request to install the enrollment configuration profile 121 that has been downloaded from the management system 103. For example, the settings application 155 can render a user interface 136 that allows the user to select the enrollment configuration profile 121 and request installation of the enrollment configuration profile 121.

Upon receiving the request to install the enrollment configuration profile 121, the settings application 155 can proceed to step 221 and install the configuration profile 121. In some instances, the enrollment configuration profile 121 can expire if it is not installed within a predefined period of time (e.g., eight minutes). If the settings application 155 determines that the enrollment configuration profile 121 has expired due to a lapse of time, the settings application 155 will not proceed with installing the enrollment configuration profile 121.

At step 227, the management component 127 can complete enrollment of the device 106. When the user manually returns to the management component 127, the management component 127 can complete enrollment by confirming that the configuration profile 121 has been installed. If the management component 127 determines that the configuration profile 121 has not been installed and the configuration profile 121 has not expired, the management component 127 can send a notification to the user informing the user that the configuration profile 121 still needs to be installed. If the management component 127 determines that the configuration profile 121 has not been installed and the profile 121 has expired, the management component 127 can restart the enrollment process.

Moving on to FIGS. 3A-3F, shown are example user interfaces 136 (e.g., 136a, 136b, 136c, 136d, 136e, and 136f) that can rendered by the management application 130 during the enrollment process of a client device 106 in the management service 115. The management application 130 can provide an enrollment interface for users by generating a series of user interfaces 136, also known as a "wizard," that facilitate enrollment a client device 106 in the management service 115 by the user. The user interfaces 136 of FIGS. 3A-3F each correspond to a different example user interface 136 that can be presented to a user during the enrollment process.

Figure 3A:
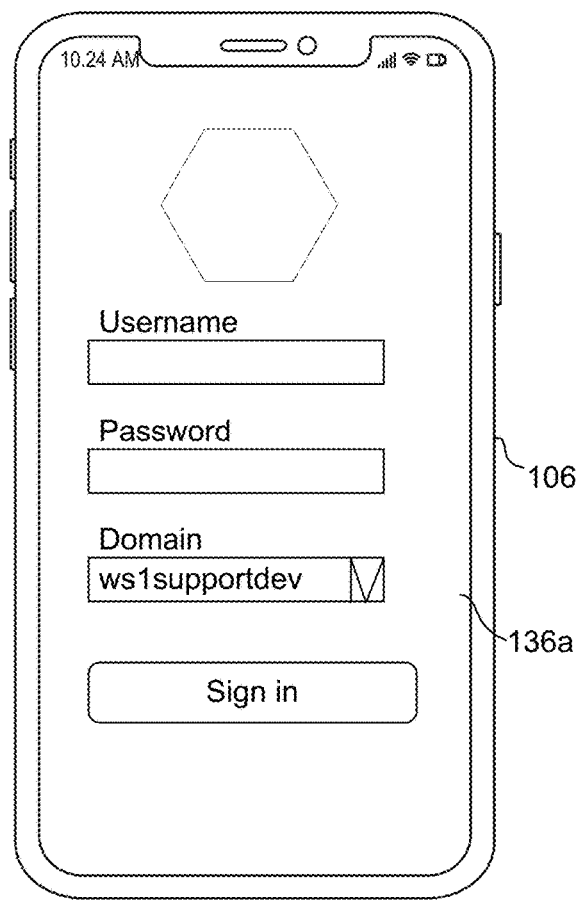
FIGS. 3A-3F are drawings of example user interfaces of a management component of the networked environment.

To begin, FIG. 3A illustrates an example user interface 136a that includes interface components for entering user identification data and domain data that can be used to identify the user of the device 106 and the domain associated with the management of the device 106. For example, the user interface 136a includes user interface components that allow a user to enter in a user name and password that can be used to identify the user. In addition, the user interface 136a includes an interface component for selecting the enterprise domain for the device 106. In various examples, the interface components can include text boxes, Boolean fields, dropdown menus, radio buttons, check boxes, buttons, or other user interface components. Although the information obtained in user interface 136a is obtained from a single user interface 136, the information can be obtained in separate user interfaces 136. For example, one user interface 136 can request domain data and another user interface 136 can obtain the user identifying information.

Figure 3B:
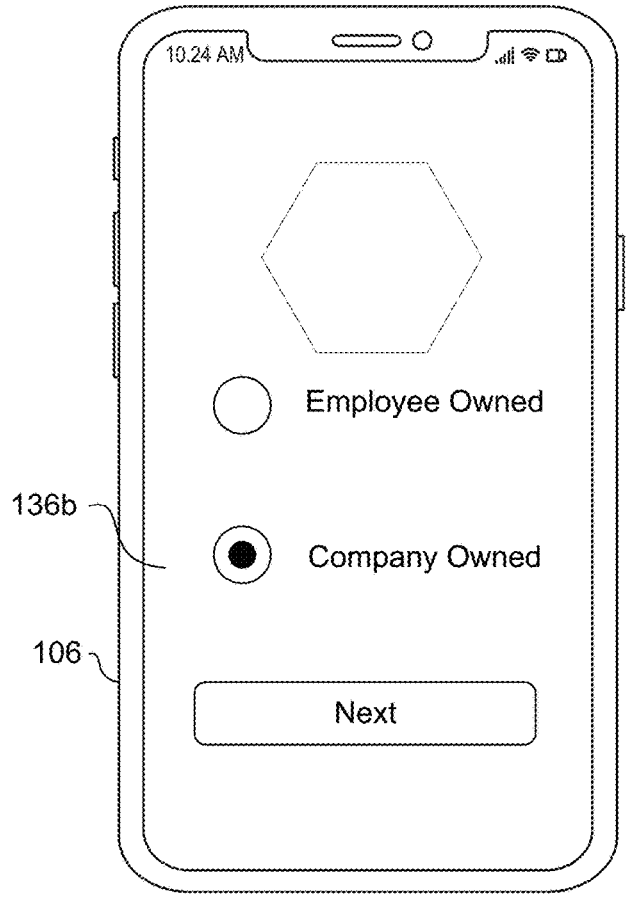

FIG. 3B illustrates an example user interface 136b that allows a user to select device data information associated with the ownership of the device 106. For example, the user interface 136b allows the user to select whether the device 106 is employee owned or company owned. This information can be used by the management service 115 to determine the appropriate policies to be applied to the device 106 during enrollment of the device in the management service 115. For example, an employee owned device might require stricter policies than a company owned device 106.

Figure 3C:
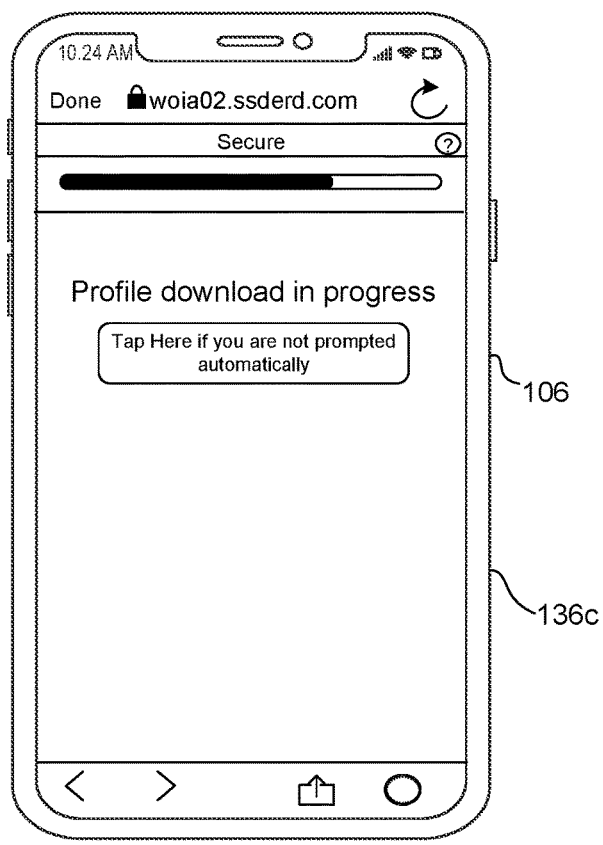

In FIG. 3C, shown is an example user interface 136c that illustrates the webpage integrated within the enrollment interface of the management application 130 for downloading the configuration profile 121. In particular, upon authentication of the user and establishment of the policies to be applied to the client device 106 by the management service 115, the management service 115 can provide a URL or other location identifier of the configuration profile 121 to be installed on the client device 106. The management application 130 instantiates a user interface object, such as Safari ViewController, using the provided URL, to access the webpage for downloading the configuration profile 121 without the redirecting the user to a browser application to complete the download of the configuration profile. In particular, for APPLE® iOS devices, the operating system 139 can require the configuration profile 121 to be downloaded using a particular web browser (e.g., SAFARI®). In this case, the SafariViewController is associated with the required web browser and can be instantiated to satisfy the requirements of the operating system 139 without redirecting the user to another application. As shown in FIG. 3C, the user can still initiate the download of the configuration profile 121 through interactions with the enrollment wizard provided by the management component 127.

Figure 3D:
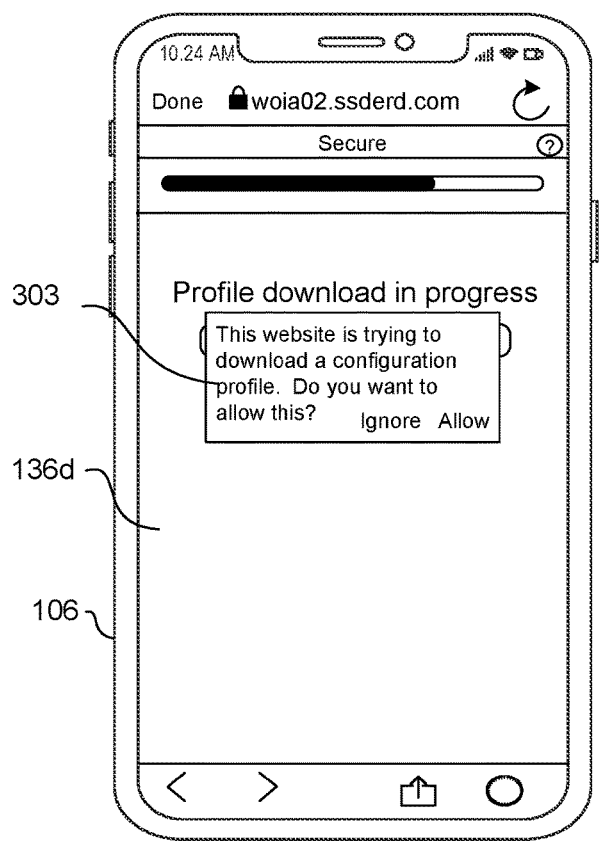

FIG. 3D provides an example user interface 136d rendered by the management application 130 and associated with the download of the configuration profile 121. FIG. 3D differs from FIG. 3C in that FIG. 3D includes a popup box 303 with a notification to the user that the website accessed through the instantiated user interface object is trying to download the configuration profile 121. The user is able to allow or deny the downloading of the configuration profile 121 through interactions with the popup box 303.

Figure 3E:
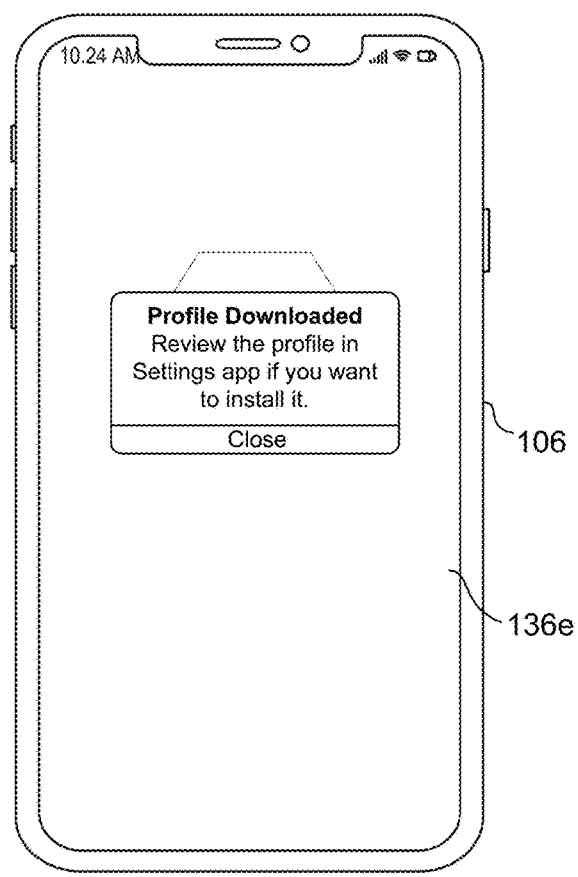

FIG. 3E provides an example user interface 136e rendered by the management application 130 as part of the enrollment wizard. In FIG. 3E, the user is notified that the configuration profile 121 has been downloaded. In addition, the user is instructed that a review and installation of the configuration profile 121 can be done in the settings application 155.

Figure 3F:
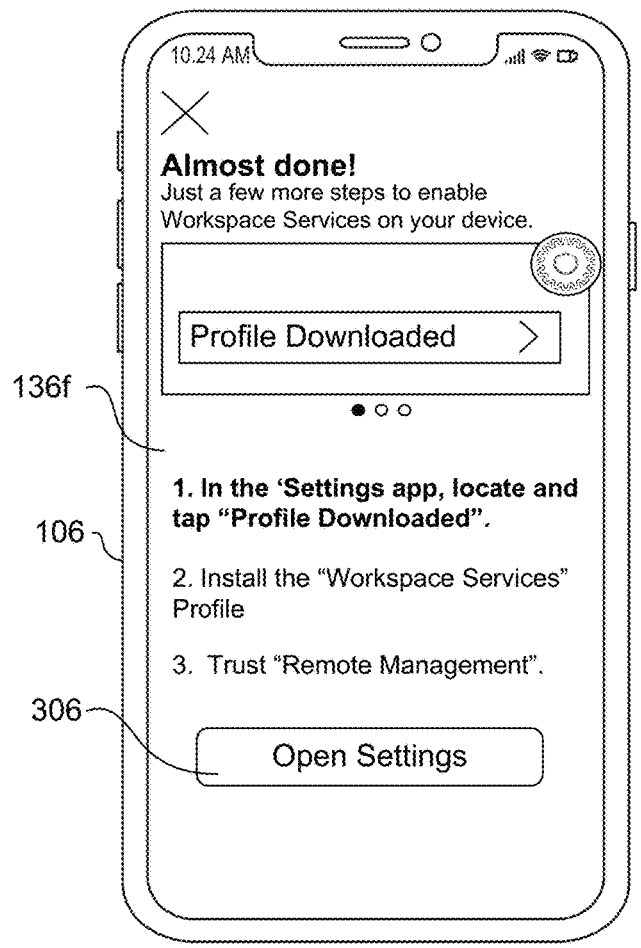

FIG. 3F provides an example user interface 136f rendered by the management application 130 as part of the enrollment wizard. In FIG. 3F, the user is provided step-by-step instructions for installing the configuration profile 121 in the settings application 155. Since the user has to be redirected to the settings application 155 to install the configuration profile 121, the user interface 136f provides an opportunity to provide visual steps to educate the user what he or she will need to do in the settings application 155 to successfully install the configuration profile 121. The user interface 136f further includes a selectable component 306 that, upon selection, redirects the user to the settings application 155 so that the user can install the configuration profile 121.

Figure 4:
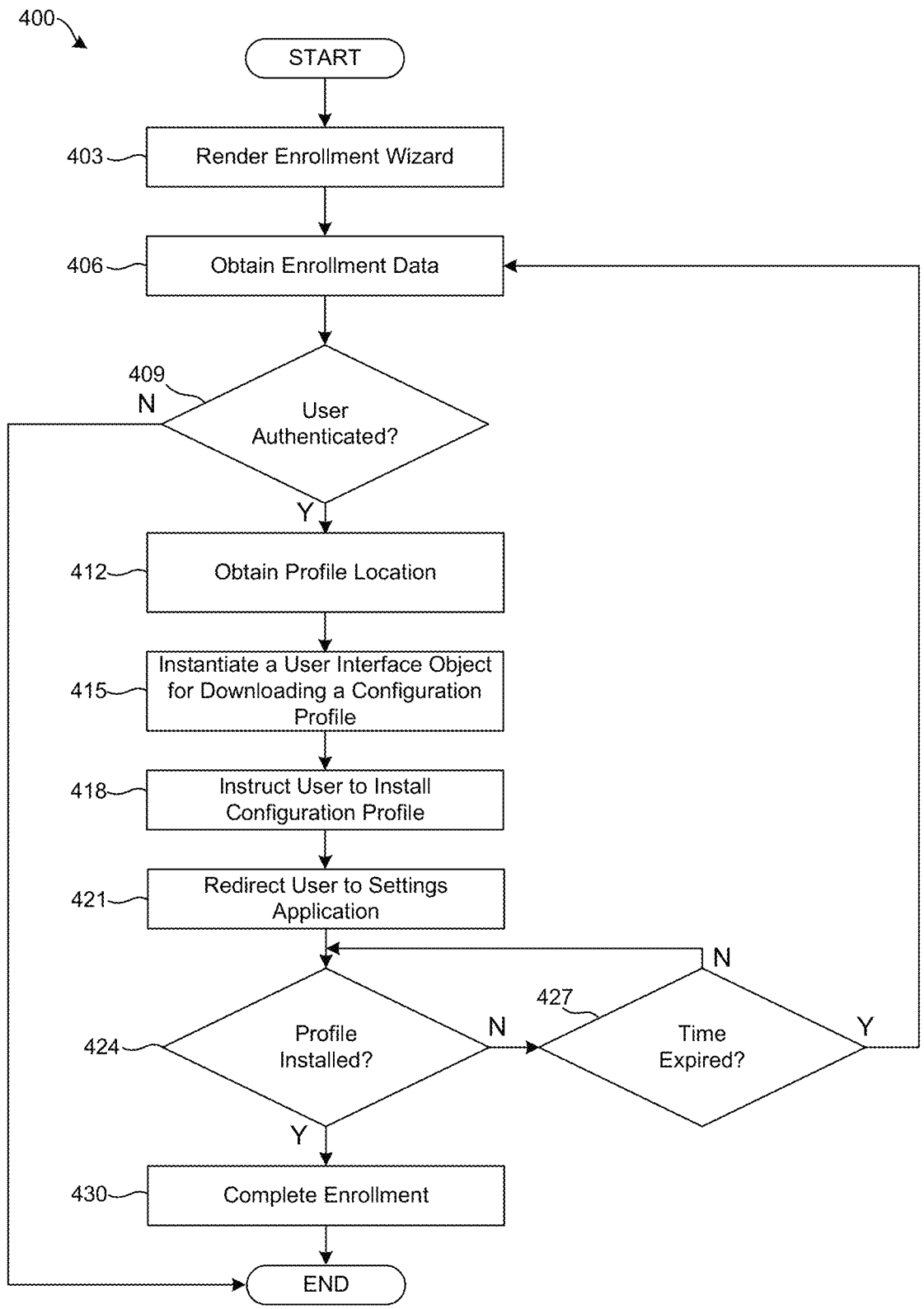
FIG. 4 is example flowcharts illustrating functionality implemented by components of the networked environment.

Moving on to FIG. 4, shown is a flowchart 400 that provides one example of the operation of a portion of the client device 106. The flowchart of FIG. 4 can be viewed as depicting an example of elements of a method implemented by the management component 127, management application 130, or other suitable software component according to one or more examples. The separation or segmentation of functionality as discussed herein is presented for illustrative purposes only.

In step 403, the management application 130 renders the enrollment wizard including a series of user interfaces to initiate the enrollment process of a device 106. In some examples, the management application 130 can determine if the device has already been enrolled, the enrollment process has already begun with the device (e.g., configuration profile 121 has been downloaded and installed), the configuration profile 121 was downloaded but not installed in the allotted time before the configuration profile 121 expired, or if the enrollment process is being initiated for the first time with the particular device 106. The management application 130 can direct the user to the appropriate user interface 136 of the enrollment wizard based on the current status of the device 106 in the enrollment process. For the purposes of discussion, assume that the device 106 has not yet started the enrollment process and the user interface 136 rendered corresponds to the first user interface 136 in the series of user interface 136 associated with the enrollment wizard.

In step 406, the management application 130 obtains enrollment data. The enrollment data can include authentication data (e.g., user account data 142), device data 145, or other type of information that can be used to authenticate the user or device 106 with the management service 115 and begin the enrollment process. For example, the user can submit a user name and password, or other type of identifying information, which can be used to identify the user. In some examples, the user can submit domain information which can be used to identify the enterprise or organization domain associated with the device 106. The enrollment data can further include device data 145 (e.g., make, model, type of client device) associated with the device with or without user input. The enrollment data can sent to the management service 115 which can in turn authenticate the user and determine which policies are to be applied to the device based on the user account data 142, device data 145, and other information.

In step 409, the management application 130 determines if the user is authenticated. For example, the management service 115 can provide a notification to the management application 130 indicating whether the user is authenticated and whether the enrollment of the user device 106 can continue. If the user is no longer associated with the enterprise or organization, if the authentication data is invalid, or if the user has restrictions in place for adding additional devices 106, the management service 115 can indicate that the user is not authenticated. If the user is not authenticated, the device 106 is not enrolled and this portion of the process proceeds to completion. Otherwise, the management application 130 proceeds to step 412.

In step 412, the management application 130 obtains the location of the configuration profile 121 from the management service 115. For example, the management service 115 can place a URL or other address associated with the configuration profile 121 in the command queue and the management application 130 obtains the location from the command queue. In another example, the management service 115 sends a notification to the management application 130 including the location of the configuration profile 121. The configuration profile 121 is specific to the enrolling device and the settings defined in the configuration profile 121 correspond to policies determined by the management service 115 to be applied to the enrolling device 106.

In step 415, the management application 130 instantiates a user interface object (e.g., Safari ViewController) to access a webpage associated with the download of the configuration profile 121. By instantiating the user interface object to access the webpage, the management application 130 can integrate the webpage into the enrollment wizard such that the user does not need to download the configuration profile 121 in a separate client application 124. As such, the user remains engaged with the enrollment process and does not have to return to the management application 130 to continue with the enrollment process after downloading the configuration profile 121. By being able to present the webpage to the user through a user interface 136 of the enrollment wizard, the user is able to allow the configuration profile 121 to be downloaded without being redirected to a separate client application 124.

In step 418, the management application 130 instructs the user to install the configuration profile 121. For example, where the operating system 139 requires the user to install the configuration profile 121 in the settings application 155, the management application 130 can render a user interface 136 that includes instructions on how to install the configuration profile 121 in the settings application 155. In one example, the management application 130 can render a user interface 136 that includes visual step-by-step instructions illustrating what the user may see while interacting with the settings application 155 and what steps the user is required to do to complete the installation of the configuration profile 121. Although the user is redirected to another application to install the configuration profile 121, the management application 130 can educate the user to minimize potential confusion which can cause the enrollment process to fail.

In step 421, the management application 130 redirects the user to the settings application 155. For example, the user may select a component in a user interface 136 requesting redirection to the settings application 155. In response, the management application 130 can cause the settings application 155 to be opened to allow the user to interact with the settings application 155 and install the configuration profile 121.

In step 424, the management application 130 determines whether the configuration profile 121 has been installed. If the configuration profile 121 has been installed, the management application 130 proceeds to step 430. If the configuration profile 121 has not been installed, the management application 130 proceeds to step 427.

In step 427, the management application 130 determines if a predefined period of time has elapsed from the time the configuration profile 121 was downloaded. For example, the configuration profile 121 can expire if it is not downloaded within a predefined period of time. The predefined period of time can be set by the operating system 139, the management application 130, or other application. If the management application 130 determines that the time has expired and the configuration profile has failed to be installed in the predefined period of time, the management application 130 returns to step 406 to restart the enrollment process. In some implementations, the management application 130 can provide a notification to the user that the configuration profile has expired and needs to be re-downloaded.

If the management application 130 determines that the time has not elapsed, the management application returns to step 424. In some examples, the management application 130 can send a push notification, or other type of notification, to notify the user that the configuration profile 121 still needs to be installed.

In step 430, the management application 130 completes the enrollment process of the client device 106. For example, the management application 130 can confirm that the installation of the configuration profile 121 has completed. In some examples, the management application 130 can send a notification to the management service 115 to indicate that the enrollment is complete. Thereafter, the process proceeds to completion.

A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. Also, a processor can represent multiple processors or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

Although the management service 115, client applications 124, management components 127, settings applications 155, and other various services and functions described can be embodied in software or code executed by general purpose hardware as discussed above, as an alternative, the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The flowcharts show an example of the functionality and operation of an implementation of portions of components described. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, one or more of the blocks shown in the drawings can be skipped or omitted.

Also, any logic or application described that includes software or code can be embodied in any non-transitory computer-readable medium for use by or in connection with an instruction execution system such as a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described can be implemented and structured in a variety of ways. For example, one or more applications can be implemented as modules or components of a single application. Further, one or more applications described can be executed in shared or separate computing devices or a combination thereof. For example, a plurality of the applications described can execute in the same computing device, or in multiple computing devices.

It is emphasized that the above-described embodiments of the present disclosure are merely possible examples of implementations described for a clear understanding of the principles of the disclosure. Many variations and modifications can be made to the above-described embodiments without departing substantially from the spirit and principles of the disclosure. All such modifications and variations are intended to be included within the scope of this disclosure.

Therefore, the following is claimed:

1. A system, comprising:
    a client device; and
    at least one application executable in the client device, wherein the at least one application, when executed, causes the client device to:
    initiate an enrollment of the client device in a management service by rendering an enrollment wizard comprising a series of user interfaces;
    obtain enrollment data corresponding to a user associated with the client device;
    instantiate a user interface object associated with a first user interface of the series of user interfaces to access a website for initiating a download of a configuration profile provided by the management service in an instance in which the user is authenticated with the management service based on the enrollment data; and
    redirect a user to a settings application associated with an operating system of the client device to install the configuration profile in an instance in which a selectable component is selected on a second user interface of the series of user interfaces.

2. The system of claim 1, wherein, when executed, the at least one application causes the client device to at least:
    send the enrollment data to the management service; and
    determine that the user is authenticated based on a notification received from the management service.

3. The system of claim 1, wherein, when executed, the at least one application causes the client device to at least:
    receive a uniform resource locator (URL) associated with a location of the configuration profile; and
    wherein instantiating the user interface object comprises loading the URL to access the website.

4. The system of claim 1, wherein an operating system of the client device requires a specific browser application for downloading the configuration profile, the user interface object being associated with the browser application specified by the operating system.

5. The system of claim 1, wherein:
    when executed, the at least one application further causes the client device to at least determine that the configuration profile has failed to be installed within a predefined period of time; and
    the configuration profile expires after the predefined period of time following being downloaded.

6. The system of claim 5, wherein, when executed, the at least one application further causes the client device to at least render a notification indicating that the configuration profile has expired.

7. The system of claim 1, wherein the configuration profile defines a plurality of settings to be applied to the client device according to settings specified by an administrator of the management service.

8. A computer-implemented method, comprising:
    initiating, by a computing device, an enrollment of the computing device in a management service by rendering an enrollment wizard comprising a series of user interfaces;
    obtaining, by the computing device, enrollment data corresponding to a user associated with the computing device;
    instantiating, by the computing device, a user interface object associated a first user interface of the series of user interfaces to access a website for initiating a download of a configuration profile provided by the management service in an instance in which the user is authenticated with the management service based on the enrollment data;
    redirecting, by the computing device, a user to a settings application associated with an operating system of the computing device to install the configuration profile in an instance in which a selectable component is selected on a second user interface of the series of user interfaces.

9. The computer-implemented method of claim 8, further comprising:
   sending the enrollment data to the management service; and
   determining that the user is authenticated based on a notification received from the management service.

10. The computer-implemented method of claim 8, further comprising:
    receiving a uniform resource locator (URL) associated with a location of the configuration profile; and
    wherein instantiating the user interface object comprises loading the URL to access the website.

11. The computer-implemented method of claim 8, wherein an operating system of the computing device requires a specific browser application for downloading the configuration profile, the user interface object being associated with the browser application specified by the operating system.

12. The computer-implemented method of claim 8, further comprising determining that the configuration profile has failed to be installed within a predefined period of time, the configuration profile expiring after the predefined period of time following being downloaded.

13. The computer-implemented method of claim 12, further comprising rendering a notification indicating that the configuration profile has expired.

14. The computer-implemented method of claim 8, wherein the configuration profile defines a plurality of settings to be applied to the computing device according to settings specified by an administrator of the management service.

15. A non-transitory computer-readable medium embodying a program executable in a client device, wherein when executed, the program causes the client device to at least:
    initiate an enrollment of the client device in a management service by rendering an enrollment wizard comprising a series of user interfaces;
    obtain enrollment data corresponding to a user associated with the client device;
    instantiate a user interface object associated with a first user interface of the series of user interfaces to access a website for initiating a download of a configuration profile provided by the management service in an instance in which the user is authenticated with the management service based on the enrollment data; and
    redirect a user to a settings application associated with an operating system of the client device to install the configuration profile in an instance in which a selectable component is selected on a second user interface of the series of user interfaces.

16. The non-transitory computer-readable medium of claim 15, wherein
    send the enrollment data to the management service; and
    determine that the user is authenticated based on a notification received from the management service.

17. The non-transitory computer-readable medium of claim 15, wherein
    receive a uniform resource locator (URL) associated with a location of the configuration profile; and
    wherein instantiating the user interface object comprises loading the URL to access the website.

18. The non-transitory computer-readable medium of claim 15, wherein an operating system of the client device requires a specific browser application for downloading the configuration profile, the user interface object being associated with the browser application specified by the operating system.

19. The non-transitory computer-readable medium of claim 15, wherein:
    when executed, the program further causes the client device to at least determine that the configuration profile has failed to be installed within a predefined period of time; and
    the configuration profile expires after the predefined period of time following being downloaded.

20. The non-transitory computer-readable medium of claim 15, wherein the configuration profile defines a plurality of settings to be applied to the client device according to settings specified by an administrator of the management service.

* * * * *